Figure 1:
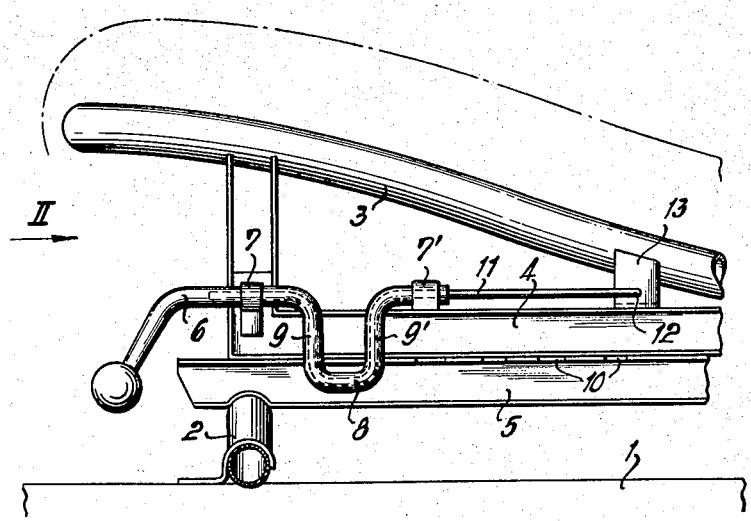

March 17, 1959 W. HÜTTISCH 2,877,824
SEAT LOCKING ARRANGEMENT
Filed May 29, 1957

INVENTOR
WALTER HÜTTISCH

BY Dicke and Bay

ATTORNEYS.

2,877,824

SEAT LOCKING ARRANGEMENT

Walter Hüttisch, Ditzingen, Wurttemberg, Germany, assignor to Dr. Ing. h. c. F. Porsche K. G., Stuttgart-Zuffenhausen, Germany Application May 29, 1957, Serial No. 662,475

Claims priority, application Germany July 3, 1956

1 Claim. (Cl. 155—14)

The present invention relates to an adjustable seat, particularly for motor vehicles, which may be locked in various positions in the longitudinal direction of the vehicle by a hand lever which is under spring tension and which engages with grooves in the seat frame.

In known arrangements of this type, the hand lever, used for locking the seat in certain positions, is under the effect or influence of a coil spring. The locking itself is accomplished by one or more locking teeth attached to the hand lever which engage with corresponding grooves or notches in the seat or base rail. However, ordinarily the use of coil springs in connection with seat-locking mechanisms requires special machining of the hand lever to enable attachment thereto of the coil spring. Moreover, such locking arrangements are composed of a multitude of parts and are, therefore, expensive to manufacture.

According to the present invention, these short-comings and disadvantages of the prior art are eliminated in that the hand lever, which effects the locking of the seat, is connected to a torsion-rod spring without thereby obviating the need for machining and/or special parts ordinarily necessary for effecting the connection between the spring and the hand lever. A locking arrangement for the seat is obtained by such a construction utilizing the very minimum of parts which do not require special cumbersome machining which, nevertheless, distinguishes itself by reliability in operation. A particularly favorable spatial arrangement of the locking device may be obtained if, according to the present invention, the torsion-rod spring is disposed coaxially with the axis of rotation of the hand lever and is secured to the seat frame. By reason of the fact that a part of the hand lever is bent into the shape of a crank which forms the locking means and that the torsion-rod spring extends at least over the range of the crank through the hollow hand lever, only two parts are required to effect locking of the seat according to the present invention.

Accordingly, it is an object of the present invention to provide an adjustable seat locking device which consists of a minimum of parts that require no machining.

It is another object of the present invention to provide an adjustable seat locking device which is inexpensive to build, is reliable in operation and requires the minimum of space for installing it within the seat frame.

Figure 2:
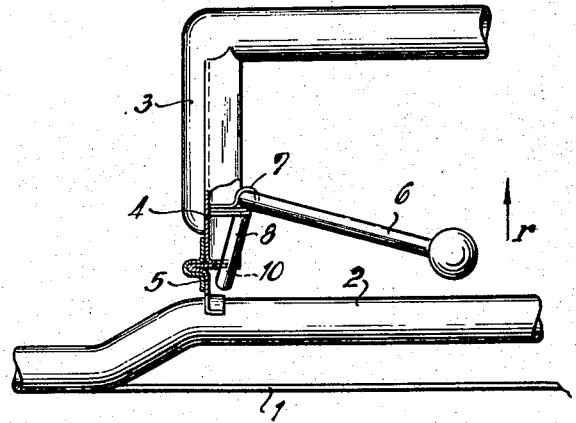

These and further objects, features and advantages of the present invention will become more obvious from the following description of an adjustable seat arrangement in accordance with the present invention when taken in connection with the accompanying drawing which shows, for purpose of illustration only, one preferred embodiment in accordance with the present invention and wherein:

Figure 1 is a side view of the adjustable seat arrangement in accordance with the present invention, and Figure 2 is a view thereof taken in the direction of arrow II of Figure 1.

Referring now to the drawing wherein like reference numerals are used throughout the various views to designate like parts, the seat support member 2 is connected in a conventional manner to the floor 1 of the vehicle. The seat assembly 3 is slidably and adjustably mounted on the seat support member 2.

The seat assembly 3 is provided with a guide rail 4 which rests slidably on the base rail 5. The base rail 5 is supported on the support member 2. A hand lever 6 extends along one of the rails 4 which lever 6 effects locking the seat assembly in position. The lever 6 is formed from a tube and is rotatably supported in the bearings or journals 7 and 7'. Intermediate the bearings or journals 7 and 7' the lever 6 is bent angularly into the shape of a crank 8, the webs 9 and 9' of which engage with cut-out portions or notches 10 provided in base rail 5. A torsion-rod spring 11 is disposed at the inside of the hollow hand lever 6. The torsion-rod spring 11 is secured by means of an angularly bent end portion 12 in the support member 13 of the seat 3 to prevent the torsion-rod spring from turning thereat.

The other end of the torsion-rod spring 11 extends past the crank portion 8 along the inside of lever 6 without being secured thereto whereby the lever 6 is normally retained in the locking position thereof without requiring any other connection between the lever 6 and the torsion-rod spring 11.

In order to adjust the position of the seat the hand lever 6 is turned against the torsion-rod spring tension in the direction of the arrow r (Figure 2). By thus rotating lever 6, the webs 9 and 9' of the crank 8 are disengaged from the corresponding cut-out portions or notches 10 provided in the base rail 5 whereupon the seat may be selectively adjusted forwardly or rearwardly. After the lever 6 is released, the webs 9 and 9' reengage with corresponding notches 10 thereby again locking the seat.

While I have shown one preferred embodiment of my invention, it is understood that the same is not limited thereto but is susceptible of many changes and modifications within the scope of a person skilled in the art, and I intend to cover all such changes and modifications as encompassed by the appended claim.

I claim:

A locking device for adjustable seats comprising base means provided with notches, seat means slidable on said base means, a hollow hand lever rotatably supported on said seat means, said hollow hand lever having a crank element integral therewith, said crank element comprising two hollow arms spaced by a hollow connecting part, a torsion spring having a portion received in said two hollow arms and in said connecting part, said torsion spring having a further portion comprising a bent end, said bent end being secured in said seat means, said seat means being locked in a selected position on said base means by engagement of each of said two hollow arms with two of said notches on said base means.

References Cited in the file of this patent

UNITED STATES PATENTS 1,440,025    Nicholson    Dec. 26, 1922

FOREIGN PATENTS 286,119    Great Britain    Mar. 1, 1928
626,327    Germany    Feb. 24, 1936